March 19, 1929.      C. L. CHARLES      1,706,350
MEANS FOR SUPPORTING CAR BODIES ON TRUCKS
Filed April 24, 1925
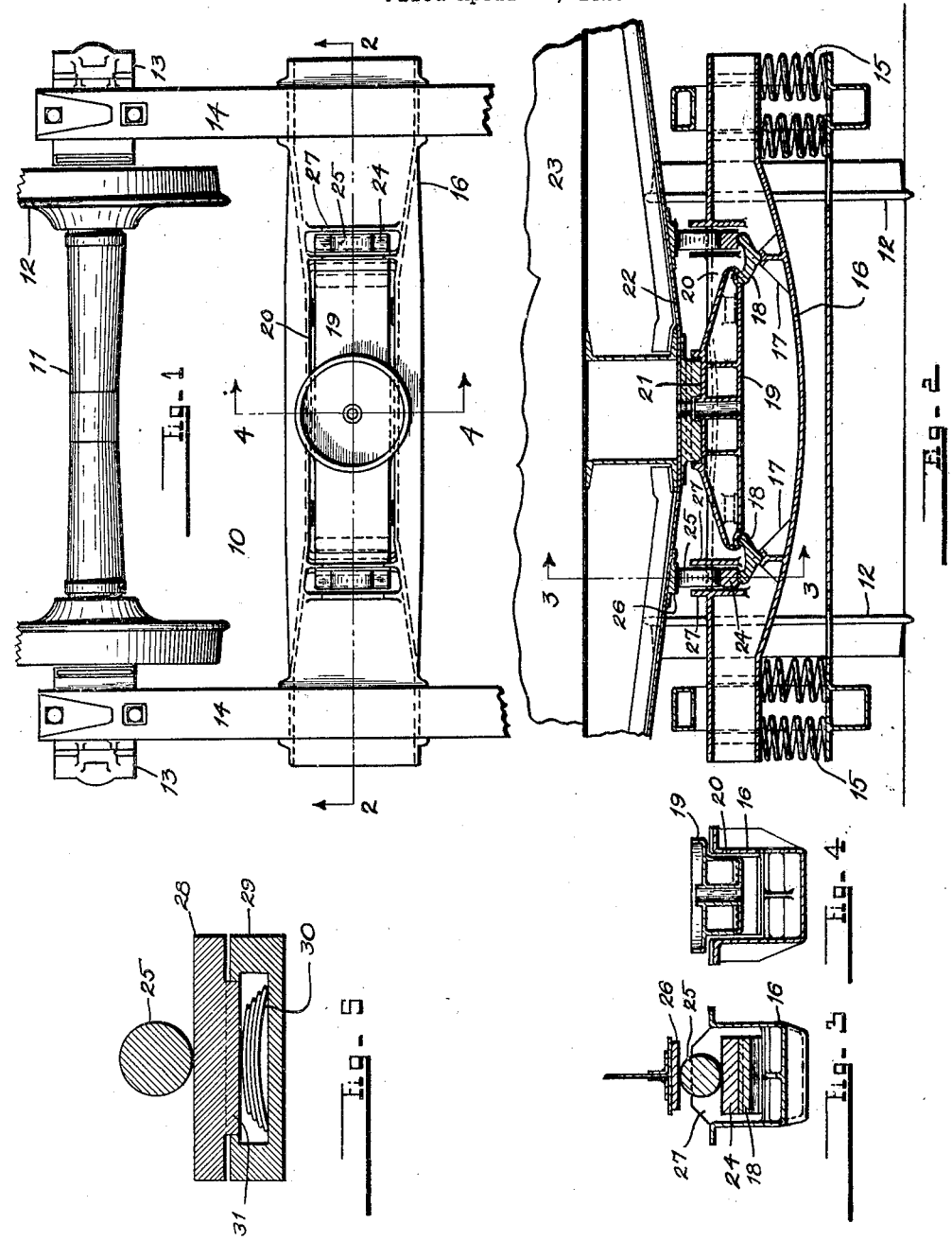
INVENTOR
Carl L. Charles
John W Darley
ATTORNEY Patented Mar. 19, 1929.

1,706,350

UNITED STATES PATENT OFFICE.

CARL L. CHARLES, OF BALTIMORE, MARYLAND.

MEANS FOR SUPPORTING CAR BODIES ON TRUCKS.

Application filed April 24, 1925. Serial No. 25,475.

My invention relates to means for supporting a car body on a truck.

Among the objects of my invention are:

To devise a means for supporting a car body on a truck in which said body, or a portion thereof for a double truck construction, is initially supported at a plurality of separated points, preferably three, the load being ultimately transmitted to said truck through other points, preferably two, which are disposed between the wheel flanges and on either side of and closer to the longitudinal axis of said truck than now obtains in the art.

To devise a means of the foregoing class which is characterized by side bearings having continuous positive contact with the under part of the car body, said bearings being further arranged to achieve a self-adjusting function which maintains the positiveness of said contact regardless of the wear of the center plate, side bearings or wear plates.

To devise a car supporting means of the character described which utilizes the weight of the car body and its attendant loading to maintain the contact of the side bearings with said body.

To devise a means of the character described which shall materially reduce the oscillation of bodies having a high center of gravity, thereby preventing the abnormal increase in the load carried by the wheels on one side of the truck.

Trucks as now constructed support the car body either by means of center plates, together with the usual auxiliary side bearings, or directly on the truck through a plurality of side bearings, the center plates being omitted. As bodies are usually carried on two trucks, the first method provides for an initial two point support of the body, the supports being disposed along the longitudinal axis of the body and hence in the least desirable position relative to controlling the oscillation of the body. The rocking movement of the body causes load to be thrown onto either of the side bearings and therefore increases the load on the wheels on that side of the truck and at the same time decreases the load on the opposite side. As this oscillative action is cumulative, the difference in wheel loadings increases and hence, the lightly loaded wheels, relatively considered, on one side of the truck constitute a hazard in railroad operation, the trucks being frequently derailed from that cause. The provision of side bearings with the usual clearances is not entirely effective to overcome the foregoing tendency, as the roll of the body sets up destructive impact loads which rapidly wear the side bearings and the cooperating plates, producing excessive clearances which must be continually shimmed to prevent excessive body oscillation.

In the second method of loading, the car body is supported at four points. This method is satisfactory in respect of the control of body oscillation, but it introduces a further problem of inequality in wheel loading as the trucks pass over uneven track, for this method carries the load outside of the wheels.

If the car body always remained symmetrical with respect to the trucks, the center plate method of loading would be ideal in that the load would be applied substantially at the mid-point on each truck and therefore each wheel thereof would be equally loaded. Unequal loading, inequalities in track contour, and the traversing of curves, however, set up an oscillation of the car body which introduces a serious factor in truck loading. The resultant of the vertical forces acting on a truck, whether due to the dead weight of the body and its load, the forces set up by body oscillation, or a combination of both, determines the load that is finally carried by each wheel. It is obvious that the closer this resultant is brought to the longitudinal center line of the truck, the more nearly will the loads carried by the wheels on each side of the truck be equalized and hence the so-called light wheel hazard will be greatly minimized, with a resulting increase in the safety of operation. My invention is directed to approximating this condition as closely as is practicable, having due regard to service operation while at the same time reducing body oscillation materially. It comprises a combination of elements so arranged that the car body is initially supported at three points by virtue of its own and the lading weight, thus retarding oscillation, but the load is finally applied to the truck at two points which are disposed on each side of the longitudinal axis of the truck and much closer together than now obtains in practice.

In the drawing, my invention is illustrated as applied to a four wheel truck of standard construction, but it is to be understood that this illustration is for the purpose of disclosure only, as my improved construction may be readily adapted to any type of truck, whether four, six, or eight wheels.

These and further objects will be set forth in the following specification, reference being had to the accompanying drawing, and the novel means by which said objects are effectuated will be definitely pointed out in the claims.

In the drawings:

Fig. 1 is a fragmentary plan view of a four wheel truck, having my improved means applied thereto.

Fig. 2 is a section along the line 2—2 in Fig. 1, looking in the direction of the arrows.

Fig. 3 is a partial section along the line 3—3 in Fig. 2, looking in the direction of the arrows.

Fig. 4 is a section along the line 4—4 in Fig. 1, looking in the direction of the arrows.

Fig. 5 is a partial, enlarged section along the line 3—3 in Fig. 2, looking in the direction of the arrows and showing a modified form of side bearing used with my invention.

In the drawings:

The numeral 10 represents a four wheel truck which is provided with the usual axles 11, wheels 12 and journal boxes 13. Mounted on said boxes are the side frames 14 which carry the truck springs 15 and a truck bolster 16 rests on said springs. The foregoing parts are of standard construction, with the exception of a slight modification in the bolster 16, to which reference is hereinafter made.

The bolster 16 is cored out in the usual manner and a pair of brackets 17 are carried within said bolster on the lower side thereof, being disposed between the wheels 12 for a purpose hereinafter mentioned. Each of said brackets is grooved for the reception of a lever means 18 which is rockably mounted thereon. This form of mounting may be replaced by a pin on which the lever means can rotate, the essential requirement being that a pressure exerted in one direction on one end of said lever means will cause, or tend to cause, a movement of the opposite end of said means in the opposite direction. Therefore, I consider that any form of mounting of the lever means 18 which will accomplish this purpose to be within the scope of my invention.

A beam 19 rests upon the inner ends of the lever means 18 and said beam extends upward through an opening 20 provided in the bolster 16. Said beam is provided with the truck center plate 21 and said plate contacts with the center plate on the body bolster 22 of a car body 23 in any approved manner.

Blocks, such as 24, are mounted upon the outer ends of the lever means 18 and said blocks serve as tracks for the support of the roller side bearings 25 which extend upwards to contact with the body wear plates 26, the traverse of said bearings being contained within the guides 27 formed on the bolster 16. The side bearings as illustrated are intended to be representative of any type thereof, as my invention is not limited to any particular form in that respect. In Fig. 5, a resilient means of supporting the bearing 25 is shown in which the block 24 is made in two parts, an upper portion 28 and a lower portion 29. The portion 29 is recessed for the reception of a leaf spring 30 and the portion 28 rests on said spring through an extension 31 formed on said portion which extends into said recess. As the portion 28 contacts with the bearing 25, a cushioning effect is thereby provided.

From the foregoing, it will be obvious that the body 23 is initially supported at three points and since the movement vertically of the bearings 25 and the center plate 21 is mutually dependent, by reason of the provision of the lever means 18, said points contact continuously with the under part of said body. A plurality of separated and positively acting supports is therefore afforded which serves to effectively prevent any excessive oscillation of the car body 23, for since the usual clearances between the body and the side bearings are omitted, the swing of the body does not have any opportunity to become cumulative and destructive impact loads on the wheels are by that means avoided. Moreover, while the foregoing advantages are obtained, the load as finally applied to the truck is brought closer to the longitudinal axis thereof than now obtains in practice and a closer approximation to an ideal condition of center loading of the truck is afforded.

The tendency of the body 23 to rock is further retarded by the means of applying the weight of said body and its loading to the truck bolster. It will be observed that this total weight is applied to said bolster at two points which are disposed on each side of the longitudinal axis of the truck. From this construction, it follows that in order for the body 23 to rock in any one direction, said body must move about one of the points on the bolster hereinbefore mentioned. This movement would necessitate a raising of the weight of the body and its loading against the force of gravity. Hence, the weight of the body and its loading, which has heretofore been a fruitful source of excessive body oscillation, is utilized through my invention as an effective means of retarding, or largely preventing, said oscillation.

A further advantage of my construction lies in a self-adjusting feature whereby the positiveness of the contact of the truck center plate 21 and the side bearings 25 with the under part of the car body is always maintained, regardless of any wear of said elements. Hence, shimming on the side bearings is not required. From an inspection of the drawing, it will be obvious that if the side bearings 25 wear more rapidly than the center plate 21, the weight of the car body 23 operating through said plate, the beam 19 and the lever means 18 will serve to prevent the formation of any clearance between said bearings and the car body and will effectively maintain the positiveness of contact of said bearings with said body. A contrary action will occur in the event that the center plate 21 wears more rapidly.

While I have shown one set of elements and combinations thereof for effecting one preferred form of my invention, it is to be understood that the same is for purposes of illustration only and I do not desire to be limited to the exact forms and structures shown, for many changes may be made therein without departing from the spirit of my invention.

I claim:

1. In a car truck, the combination of a pair of lever means having ends aligned substantially in a horizontal plane, a beam carrying a truck center plate supported on the inner ends of said lever means, and a side bearing mounted on each outer end of said lever means, said plate and bearings being adapted to contact with the under part of a car body.

2. In a car truck, the combination of a pair of lever means having ends aligned substantially in a horizontal plane, a beam carrying a truck center plate supported on the inner ends of said lever means, and a side bearing mounted on each outer end of said lever means, said plate and bearings being adapted to continuously contact with the under part of a car body.

3. In a car truck, the combination of a pair of lever means having ends aligned substantially in a horizontal plane, a beam carrying a truck center plate supported on the inner ends of said lever means, and a side bearing mounted on each outer end of said lever means, said plate and bearings being adapted to contact with the under part of a car body, and the supports for said lever means being disposed between said bearings.

4. In a car truck, the combination of a pair of lever means movably mounted on said truck and having ends aligned substantially in a horizontal plane, a beam carrying a truck center plate supported on the inner ends of said lever means, and a side bearing mounted on each outer end of said lever means, said plate and bearings being adapted to contact with the under part of a car body and to move in opposite directions as either wears, thereby maintaining continuous contact with said under part.

5. In a car truck, the combination of a pair of lever means rockably mounted on said truck and having ends aligned substantially in a horizontal plane, a beam carrying a truck center plate supported on the inner ends of said lever means, and a side bearing mounted on each outer end of said lever means, said plate and bearings being adapted to contact with the under part of a car body and to move in opposite directions as either wears, thereby maintaining continuous contact with said under part.

6. In a car truck, the combination of a pair of lever beams, a beam carrying a truck center plate supported on the inner ends of said lever means, and a resilient side bearing mounted on each outer end of said lever means, said plate and bearings being adapted to contact with the under part of a car body and the supports for said lever means being disposed between said bearings.

7. In a car truck, the combination of a pair of straight lever means, a beam carrying a truck center plate supported on the inner ends of said lever means, and a side bearing mounted on each outer end of said lever means, said plate and bearings being adapted to contact with the under part of a car body.

8. In a car truck, the combination of a pair of straight lever means positioned substantially in a horizontal plane, a beam carrying a truck center plate supported on the inner ends of said lever means, and a side bearing mounted on each outer end of said lever means, said plate and bearings being adapted to contact with the under part of a car body.

9. In a car truck, the combination of a pair of lever means having ends aligned substantially in a horizontal plane, a beam carrying a truck center plate supported on the inner ends of said lever means, and a resilient side bearing mounted on each outer end of said lever means, said plate and bearings being adapted to contact with the under part of a car body.

10. In a car truck, the combination of a pair of lever means having ends aligned substantially in a horizontal plane, a beam carrying a truck center plate supported on the inner ends of said lever means, and a resilient side bearing mounted on each outer end of said lever means, said plate and bearings being adapted to contact with the under part of a car body, and the supports for said lever means being disposed between said bearings.

In testimony whereof, I affix my signature.

CARL L. CHARLES.